US007361702B2

(12) United States Patent
Schwalm et al.

(10) Patent No.: US 7,361,702 B2
(45) Date of Patent: Apr. 22, 2008

(54) COATING COMPOSITIONS

(75) Inventors: Reinhold Schwalm, Wachenheim (DE); Roman Benedikt Raether, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 104 days.

(21) Appl. No.: 10/467,801

(22) PCT Filed: Feb. 12, 2002

(86) PCT No.: PCT/EP02/01441

§ 371 (c)(1),
(2), (4) Date: Aug. 12, 2003

(87) PCT Pub. No.: WO02/064685

PCT Pub. Date: Aug. 22, 2002

(65) Prior Publication Data

US 2004/0092629 A1     May 13, 2004

(30) Foreign Application Priority Data

Feb. 13, 2001 (DE) ................. 101 06 543

(51) Int. Cl.
| B05B 3/02 | (2006.01) |
| B05B 3/08 | (2006.01) |
| C08J 3/02 | (2006.01) |
| C08J 3/09 | (2006.01) |
| C08F 2/38 | (2006.01) |
| C08K 5/32 | (2006.01) |
| C08K 5/3435 | (2006.01) |
| C08K 5/42 | (2006.01) |

(52) U.S. Cl. .............. 524/99; 524/100; 524/102; 524/103; 524/104; 524/156; 524/186; 524/259; 524/260; 427/385.5; 526/220

(58) Field of Classification Search .......... 524/99, 524/100, 102, 103, 104, 156, 186, 259, 260; 252/182; 427/385.5; 526/220
See application file for complete search history.

(56) References Cited

U.S. PATENT DOCUMENTS

| 4,833,038 A | | 5/1989 | Poole et al. | |
| 5,369,140 A | | 11/1994 | Valet et al. | |
| 5,468,789 A | | 11/1995 | Lewis et al. | |
| 6,503,983 B1 | * | 1/2003 | Morrison et al. | ........... 524/804 |
| 6,573,329 B2 | * | 6/2003 | Mc Kee et al. | ............. 524/589 |
| 6,835,288 B1 | * | 12/2004 | Sutoris et al. | ................. 203/3 |

FOREIGN PATENT DOCUMENTS

| DE | 1 694 253 | | 5/1971 |
| DE | 197 54 633 | | 6/1999 |
| DE | A-19803098 | * | 7/1999 |
| DE | A-19805586 | * | 8/1999 |
| DE | 100 08 367 | | 8/2000 |
| DE | A-19910339 | * | 9/2000 |
| WO | 98/00456 | | 1/1998 |
| WO | WO 98/13392 | * | 4/1998 |
| WO | 99 00426 | | 1/1999 |
| WO | 00 39169 | | 7/2000 |
| WO | WO 00/39169 | * | 7/2000 |

OTHER PUBLICATIONS

Polymers Paint Colour J., vol. 179, No. 4237 1989.

* cited by examiner

*Primary Examiner*—Kriellion Sanders
(74) *Attorney, Agent, or Firm*—Oblon, Spivak, McClelland, Maier & Neustadt, P.C.

(57) ABSTRACT

The invention provides coating material compositions comprising stable adducts which, at relatively high temperatures, generate radicals that possess initiating activity, and also provides processes for preparing them, and for the use of such coating material compositions. Stable adducts of this kind may be used in order to initiate polymerization of ethylenically unsaturated monomers.

10 Claims, No Drawings

COATING COMPOSITIONS

The invention relates to coating material compositions and to processes for their preparation, and also to their inventive use.

Ready-to-use coating material compositions, i.e., blends of the polymers to be cured with free-radical initiators and, if desired, further additives, frequently suffer from the drawback that they are not stable on storage but instead undergo through-curing prior to their actual use, since common thermal initiators break down into free radicals, to a small percentage extent, while still below the decomposition temperature. In order to prevent this, it is necessary to cool the blends, which hinders transportation and makes storage more expensive. Supplying coating material and initiator separately is likewise impractical, since for reasons of space, time, and cost the customers prefer a mixture which they can use immediately.

In cases of the coating of two-dimensional areas, the problem may be circumvented by using UV initiators. Examples of this are disclosed in DE-A 16 94 253, U.S. Pat. No. 5,369,140, and U.S. Pat. No. 4,833,038. In the case of a radiation-curable coating, such as in the case of the UV coating of three-dimensional surfaces of complex shape, which is described for example in DE-A 197 54 633, exposure must take place uniformly in order to prevent uncured areas remaining at critical points, such as at edges or on interior surfaces, for example. Residual uncured areas may occasionally lead to instances of sticking, to emission of low molecular mass compounds, sometimes associated with an odor nuisance or a health hazard, and also to deficient gloss and a deficient protective effect of the coating. This often necessitates expensive repeat operations, if not indeed the extremely costly disposal of valuable substrates.

Accordingly, either thermal initiators or mixtures of thermal and UV initiators (dual cure) are used. The customary dual-cure systems make use of polyaddition or condensation reactions for thermal curing (see, for example, Polymers Paint Colour J., Vol. 179, No. 4237, 1989). The cure rate of these reactions, however, is fairly slow.

WO 98/00456 describes a dual-cure process using a mixture comprising (a) a coating composition comprising a polyacrylate polyol or polyester polyol with melamine, or a polyacrylate polyol and/or a polyester polyol with polyisocyanate, or a polyester and/or a polyacrylate with an epoxy-functionalized polyester and/or polyacrylate, (b) an OH—, $NH_2$—, epoxy- or NCO— functionalized resin having at least one ethylenically unsaturated double bond, and (c) a photoinitiator.

The additional use of thermal initiators or photoinitiators is, however, accompanied by the problem described above. In the art there has been no satisfactory solution described for this problem.

It is an object of the present invention to provide coating materials and processes for preparing them that can be used to give ready-to-use, storage-stable coating materials which are stable up to high temperatures and yet still ensure uniform curing of a coating.

We have found that this object is achieved in accordance with the invention by means of a coating material composition comprising stable adducts which at relatively high temperatures produce free radicals having an initiating activity, and processes for preparing them.

The invention provides a coating material composition comprising at least one compound of the formula (I)

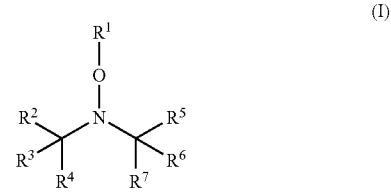

in which
$R^1$ is a radical with at least one carbon atom, and the free radical $R^1\bullet$ corresponding to $R^1$ is able to initiate a free-radical polymerization of unsaturated monomers,
the radicals $R^2$, $R^3$, $R^4$, $R^5$, $R^6$, and $R^7$ are identical or different straight- or branched-chain, substituted or unsubstituted alkyl groups, substituted or unsubstituted aralkyl, alkylaryl or aryl groups, and —$CR^2R^3$ and/or —$CR^6R^7$ may be part of a cyclic structure,
the radicals $R^4$ and $R^5$ are cyano-, ether-, hydroxyl-, nitro- or carbonyl-containing groups or $R^4CNCR^5$ is part of a substituted or unsubstituted cyclic structure to which at least one further saturated or unsaturated ring may be fuzed, or
—$CR^2R^3R^4$ or —$CR^5R^6R^7$ is part of an aromatic ring;

or at least one compound of the formula (Ia)

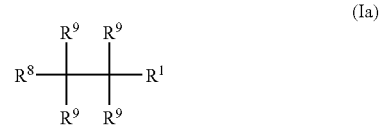

in which
$R^1$ is a radical with at least one carbon atom, and the free radical $R^1\bullet$ corresponding to $R^1$ is able to initiate a free-radical polymerization of unsaturated monomers,
$R^8$ and $R^9$ are hydrogen, identical or different straight- or branched-chain, substituted or unsubstituted alkyl groups, substituted or unsubstituted aralkyl, alkylaryl or aryl groups, which may possess a polymeric character,
at least two of the radicals $R^9$ are a phenyl radical or a substituted phenyl radical;

or a mixture of two or more thereof.

A "mixture of two or more thereof" in the context of the present invention means that the mixture in question comprises at least one compound of the formula (I) and at least one compound of the formula (Ia) or is a mixture of two or more compounds of the formula (I) or is a mixture of two or more compounds of the formula (Ia).

These binder compositions are curable either thermally free-radically alone or by combined thermal free-radical and UV free-radical polymerization. Preference is given to the combined curing.

A stable adduct in the context of the present invention is an adduct which is stable over a prolonged period in air and/or at room temperature and/or normal atmospheric humidity and/or light and which in general breaks down into initiating, nonperoxide free radicals at above 80° C., preferably above 100° C., with homolytic bond cleavage.

In the context of the present invention, a radical which possesses initiating activity is a radical which, once it has been generated, converts monomers to polymers in a chain reaction.

In the context of the invention it is possible to exert targeted control over a polymerization process to give the choice of an appropriate compound of the formula (I) having radicals $R^1$ to $R^7$ or a compound of the formula (Ia) having the radicals $R^1$, $R^8$ and $R^9$.

The radical $R^1$ of the compound of the formula (I) may contain one or more groups $ONC(R^{2-4})C(R^{5-7})$, provided each radical $R^1\bullet$ produced on cleavage of the $R^1$—O bond is able to initiate a free-radical polymerization of unsaturated monomers.

The thermal decomposition of the compound of the formula (Ia) gives rise not only to the radical $R^1\bullet$ but also to a further carbon radical. Both radicals possess an initiating activity.

The radical $R^1$ may possess a polymeric character. It is, however, preferred for the radical $R^1$ to contain not more than about 10, in particular not more than 4, repeating units. Suitable groups for $R^1$ are phenyl, methyl, tert-butyl, cyanoisopropyl or similar groups. In one possible embodiment of the present invention, $R^1\bullet$ possesses a general structure of the formula (II)

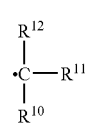

(II)

where $R^{10}$, $R^{11}$ and $R^{12}$ are the same or are different groups selected from hydrogen, alkyl, phenyl, cyano, carboxyl or cyclic groups or substituted groups thereof. The groups $R^{10}$, $R^{11}$, and $R^{12}$ may also possess a polymeric character.

In this case preferably two of the radicals $R^{10}$, $R^{11}$, and $R^{12}$ are alkyl radicals, especially methyl radicals, and the third radical is a cyano group. In one further embodiment, one of the radicals $R^{10}$, $R^{11}$, and $R^{12}$ may be composed of a plurality of repeating units. Particular preference is given to a structure of the formula (IIa)

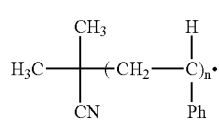

(IIa)

where n can be an integer from 0 to 10.

Stable radicals present in the compound of the formula (I) are stable N-oxyl radicals of the formula (III), which derive from a secondary amine:

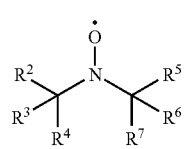

(III)

where $R^2$, $R^3$, $R^4$, $R^5$, $R^6$, and $R^7$ are identical or different straight- or branched-chain, substituted or unsubstituted alkyl groups, substituted or unsub-stituted aralkyl, alkylaryl or aryl groups, and —$CR^2R^3$ or —$CR^6R^7$ may be part of a cyclic structure. The radicals $R^4$ and $R^5$ may also be cyano, ether, hydroxyl, nitro or carbonyl-containing groups or $R^4CNCR^5$ may be part of a substituted or unsubstituted cyclic structure to which at least one further saturated or unsaturated ring may be fuzed. —$CR^2R^3R^4$ or —$CR^5R^6R^7$ may likewise be part of an aromatic ring.

Examples thereof are stable N-oxyl radicals of the formula (III) in which $R^2$, $R^3$, $R^4$, $R^5$, $R^6$, and $R^7$ are identical or different methyl, ethyl, n-propyl, iso-propyl, n-butyl, isobutyl, tert-butyl, linear or branched pentyl, phenyl, or substituted groups thereof or $R^4$ and $R^5$—where $R^4CNCR^5$ forms a part of a cyclic structure—are the cyclic structure

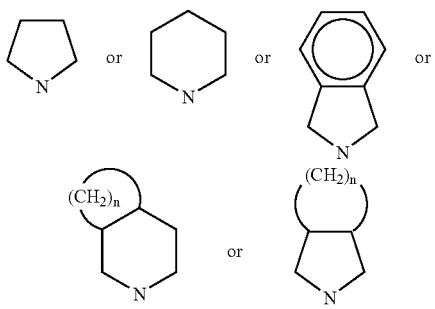

in which n is an integer from 1 to 10, preferably from 1 to 6, including substituted cyclic groups of this kind. Exemplary representatives that may be mentioned include 2,2,6,6-tetramethyl-1-oxyl-piperidine, 2,2,5,5-tetramethyl-1-oxyl-pyrrolidine, and 4-oxo-2,2,6,6-tetramethyl-1-oxyl-piperidine.

The stable N-oxyl radicals may be prepared from the corresponding secondary amines by oxidation, using hydrogen peroxide, for example. In general, they can be prepared as pure substances.

Further stable N-oxyl radicals suitable for the process of the invention are described in DE-A-19 803 098.

Particular preference is given to using the stable N-oxyl radicals 2,2,6,6-tetramethyl-1-piperidinyloxy (TEMPO), 4-hydroxy-2,2,6,6-tetramethyl-1 piperidinyloxy (HO-TEMPO) or di-tert-butyl nitroxide (DTBN).

The compounds of the formula (I) may be prepared in accordance with known methods of organic chemistry, such as are mentioned, for example, in WO 98/13392.

As initiator adduct of the formula (I) it is preferred to use 1-phenyl-1-(2',2',6',6'-tetramethyl-1'-piperidinyloxy)ethane.

The decomposition of the compound of the formula (I) takes place generally between 80 and 180° C., preferably between 95 to 160° C., with particular preference between 100 and 140° C. It is known that electron-donating groups stabilize the R—O bond whereas electron-withdrawing substituents weaken this bond. Accordingly, suitable substituents may be selected and combined almost arbitrarily in order to adapt the decomposition temperature to the requirements within a wide range, provided the compound of the formula (I) has the stability the invention requires.

The stable free radical which forms when the adducts of the formula (I) decompose may undesirably slow down the rate of the polymerization, since, with the free radicals at the end of the growing polymers, adducts may in turn be formed which are stable below a critical temperature. It is therefore possible for the coating material composition to comprise organic acids, since these destroy the stable free radical which forms. The radical which possesses an initiating activity is, however, not attacked by organic acids. As organic acid it is preferred to use p-toluenesulfonic acid.

The decomposition of the compound of the formula (Ia) takes place generally between 80 and 180° C., preferably between 95 to 160° C., with particular preference between 100 and 140° C. It is known that the C—$R^1$ bond is weakened by bulky substituents $R^9$. Accordingly, suitable substituents may be selected and combined almost arbitrarily in order to adapt the decomposition temperature to the requirements within a wide range, provided the compound of the formula (Ia) has the stability the invention requires. The decomposition of the compound of the formula (Ia) is accompanied by the formation of two radicals which possess an initiating activity.

Preferably, the compound of the formula (Ia) is a compound having a polymeric character, in particular an oligomer which has substituted ethane units.

In one particularly preferred embodiment, the compound of the formula (Ia) is a polymer having diphenylethane units.

Compounds of the formula (Ia) may be prepared, for example, by free-radical or anionic polymerization processes. Suitable processes are described, for example, in DE-A 199 10 339, DE-A 198 05 586 or WO 00/39169.

As further components of the binder composition of the invention, it is possible in principle to use all components which are known to the skilled worker and which can be used in this field.

Some examples are given below:

The coating material composition may comprise one or more ethylenically unsaturated monomers which are free-radically polymerizable, i.e., which polymerize in the presence of the radicals which possess an initiating activity.

Examples of suitable monomers containing at least one ethylenically unsaturated group include olefins such as ethylene or propylene, vinylaromatic monomers such as styrene, divinylbenzene, 2-vinylnaphthalene, and 9-vinylanthracene, substituted vinylaromatic monomers such as p-methylstyrene, α-methylstyrene, o-chlorostyrene, p-chlorostyrene, 2,4-dimethylstyrene, 4-vinyl-biphenyl, and vinyltoluene, esters of vinyl alcohol and monocarboxylic acids having from 1 to 18 carbon atoms, such as vinyl acetate, vinyl propionate, vinyl n-butyrate, vinyl laurate, and vinyl stearate, esters of α,β-monoethylenically unsaturated monocarboxylic and dicarboxylic acids having 3 to 6 carbon atoms, such as particularly acrylic acid, methacrylic acid, maleic acid, fumaric acid, and itaconic acid, with alkanols having generally 1 to 20, preferably 1 to 12, with particular preference 1 to 8, and with very particular preference 1 to 4 carbon atoms, such as particularly methyl, ethyl, n-butyl, isobutyl, tert-butyl, and 2-ethylhexyl acrylate and methacrylate, dimethyl maleate or n-butyl maleate, the nitriles of the aforementioned α,β-monoethylenically unsaturated monocarboxylic acids, such as acrylonitrile and methacrylonitrile, and also $C_{4-8}$ conjugated dienes such as 1,3-butadiene and isoprene, and acrylic acid or methacrylic acid.

Suitable styrene compounds are those of the formula IV

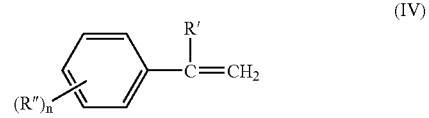

in which R' and R" independently of one another are H or $C_1$ to $C_8$ alkyl and n is 0, 1, 2 or 3.

Accordingly, in the process of the invention it is preferred to use ethylenically unsaturated monomers selected from
styrene compounds of the formula IV,
acrylic acid or methacrylic acid or their $C_1$ to $C_{20}$ alkyl esters
dienes having conjugated double bonds,
ethylenically unsaturated dicarboxylic acids and their derivatives, and
ethylenically unsaturated nitrile compounds.

In the process of the invention it is particularly preferred to use the monomers styrene, α-methylstyrene, divinylbenzene, vinyltoluene, $C_1$ to $C_8$ alkyl (meth)acrylates, especially n-butyl acrylate, 2-ethylhexyl acrylate or methyl methacrylate, and butadiene, and also acrylonitrile and also monomer mixtures composed at least 85% by weight of the aforementioned monomers or mixtures of the aforementioned monomers, with very particular preference given to styrene and methyl methacrylate.

In the preparation of polymers it is also possible, for example, to use crosslinking monomers. Crosslinking monomers are di- or polyfunctional comonomers having at least two olefinic double bonds, examples being butadiene and isoprene, divinyl esters of dicarboxylic acids such as succinic acid and adipic acid, diallyl and divinyl ethers, difunctional alcohols such as ethylene glycol and butane-1, 4-diol, the esters of acrylic acid and methacrylic acid with said difunctional alcohols, 1,4-divinylbenzene, and triallyl cyanurate. Particular preference is given to the acrylate of tricyclodecenyl alcohol, which is known under the name dihydrodicyclopentadienyl acrylate, and also to the allyl esters of acrylic acid and of methacrylic acid.

It is also possible to add additives which give the polymers certain properties. By way of example of such additives, mention may be made of polymers, dyes and pigments, and ferromagnetic pigments.

The fraction of the additives is generally 0.1% by weight, preferably at least 0.5% by weight, based on the total mass of the mixture.

Therefore, the present invention also relates to the use of a substance of the formula (I) or (Ia) for addition to coating material compositions.

The invention additionally provides a process for producing at least one coating on at least one substrate surface, using a coating material composition comprising a compound of the formula (I) or of the formula (Ia). For this process according to the present invention a coating material composition according to the invention is contacted with the substrate surface.

Depending on the field in which they are employed, the coating materials of the invention may comprise appropriate additives, such as polymers, especially crosslinkers, crosslinking catalysts, especially pigments or customary coatings auxiliaries, dyes, fillers, reinforcing fillers, rheological aids, wetting agents, dispersants, defoamers, adhesion promoters, additives for improving the surface smoothness, flatting agents, leveling agents, film formation auxiliaries, dryers, antiskinning agents, light stabilizers, corrosion inhibitors, biocides, flame retardants, polymerization inhibitors, especially photoinhibitors, or plasticizers, such as are customary and known, for example, in the plastics or coatings sector.

The selection of the additives is guided by the desired properties profile of the coating material and its intended use.

Preferably, the coating material compositions of the invention are used as or in a binder for liquid coating systems or coating dispersions.

The coating material compositions of the invention may be applied using the known methods of applying liquid phases, such as dipping, spraying, knife coating, brushing, roller coating or curtain coating. Examples of suitable substrates are films, foils, fibers, sheet metals, textiles or moldings, especially automobile body components, made of metal, glass, wood, paper, plastic, leather, mineral substrates or composites thereof. In the course of application, the substrates may be at rest or may be moved, such as in the case of the coil coating process, for instance.

Moreover, the coating material compositions of the invention may be employed in powder form, especially in the context of powder coating.

In particular, the coating material compositions of the invention may be constituents of multicoat paint systems, such as are encountered, for example, in automotive OEM finishing, automotive refinish, the coating of plastics, industrial coating, container coating, the coil coating process, or furniture coating.

In the text below, the present invention will now be illustrated with reference to a number of examples.

EXAMPLES

For all of the examples described, the coating material used was a urethane acrylate, synthesized from the isocyanurate of hexamethylene diisocyanate reacted with hydroxyethyl acrylate. In all cases, the free-radical adduct used was 1-phenyl-1-(2',2',6',6'-tetramethyl-1'-piperidinyloxy) ethane.

Storage Stability:

In order to demonstrate the positive effect of the adducts on storage stability, the urethane acrylate was mixed in one case with 3% by weight of benzoyl peroxide, a customary thermal initiator in polymer chemistry, and once with 3% by weight of adduct, and the mixtures were stored at 130° C. Table 1 shows the result.

TABLE 1

| | After 1 h | After 24 h |
|---|---|---|
| Coating formulation with adduct | liquid | liquid |
| Coating formulation with benzol peroxide | solid | solid |

Effect of Added Acid:

The urethane acrylate was mixed once with free-radical adduct (coating formulation 1) and once with free-radical adduct and p-toluenesulfonic acid (coating formulation 2). The coating formulations were subsequently heated at 150° C. for 10 minutes. In order to measure the curing process, the pendulum hardness of the cured coatings was determined in accordance with DIN 53157. Table 2 shows the results.

TABLE 2

| % by weight of adduct or adduct/acid | Pendulum hardness coating 1 | Pendulum hardness coating 2 |
|---|---|---|
| 5 | 6 | 59 |
| 2.5 | 14 | 89 |
| 1.7 | 61 | 106 |

What is claimed is:
1. A coating material composition, comprising:
(A) one or more of (i) at least one compound of the formula (I)

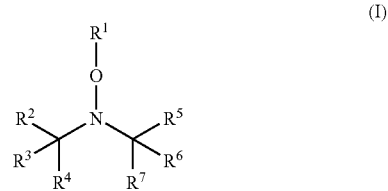

in which
$R^1$ is a radical with at least one carbon atom, and the free radical $R^1\bullet$ corresponding to $R^1$ is able to initiate a free-radical polymerization of unsaturated monomers,
the radicals $R^2$, $R^3$, $R^4$, $R^5$, $R^6$, and $R^7$ are identical or different straight or branched-chain, substituted or unsubstituted alkyl groups, substituted or unsubstituted aralkyl, alkylaryl or aryl groups, and —$CR^2R^3$ or —$CR^6R^7$ may be part of a cyclic structure,
the radicals $R^4$ and $R^5$ are cyano-, ether-, hydroxyl-, nitro- or carbonyl-containing groups or $R^4CNCR^5$ is part of a substituted or unsubstituted cyclic structure to which at least one further saturated or unsaturated ring may be fused, or
—$CR^2R^3R^4$ or —$CR^5R^6R^7$ is part of an aromatic ring; and
(ii) at least one compound of the formula (Ia)

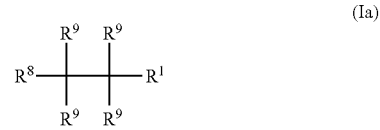

in which
$R^1$ is a radical with at least one carbon atom, and the free radical $R^1\bullet$ corresponding to $R^1$ is able to initiate a free-radical polymerization of unsaturated monomers,
$R^8$ and $R^9$ are hydrogen, identical or different straight- or branched chain, substituted or unsubstituted alkyl groups, substituted or unsubstituted aralkyl, alkylaryl or aryl groups, which may possess a polymeric character,
at least two of the radicals $R^9$ are a phenyl radical or a substituted phenyl radical; and
(B) p-toluenesulfonic acid,
one or more ethylenically unsaturated monomers, and at least one additive selected from the group consisting of a polymer, a crosslinker, a crosslinking catalyst, a pigment, a dye, a filler, a reinforcing filler, a rheological aid, a wetting agent, a defoamer, an adhesion promoter, an additive for improving the surface smoothness, a flatting agent, a leveling agent, a film formation auxiliary, a dryer, an antiskinning agent, a light stabilizer, a corrosion inhibitor, a biocide, a flame retardant, a polymerization inhibitor, a photoinhibitor and a plasticizer; and wherein the composition comprises the compound of formula I(a) which comprises diphenyl ethane units.

2. A coating material composition as claimed in claim 1, comprising the compound of formula (I) in the form of an initiator adduct, and wherein 2,2,6,6-tetramethyl-1-piperidinyloxy (TEMPO), 4-hydroxy-2,2,6,6-tetra-methyl-1-piperidinyloxy (HO-TEMPO) or di-tert-butyl nitroxide (DTBN) are present as stable N-oxyl radicals.

3. A coating material composition as claimed in claim 1, wherein the ethylenically unsaturated monomer is selected from the group consisting of:

styrene compounds of the formula (IV)

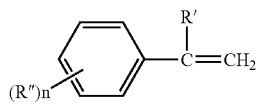

in which R' and R" independently of one another are H or $C_1$—$C_8$ alkyl and n is 0, 1, 2 or 3;

acrylic acid or methacrylic acid or their $C_1$—$C_{20}$ alkyl esters;

dienes comprising conjugated double bonds;

ethylenically unsaturated dicarboxylic acids and their derivatives;

and ethylenically unsaturated nitrile compounds.

4. A coating material composition as claimed in claim 1, wherein 1-phenyl-1-(2', 2', 6', 6'-tetramethyl-1'-piperidinyloxy)ethane is used as the compound of formula (I).

5. A process for producing at least one coating on at least one substrate surface, which comprises contacting the substrate surface with a coating material composition as claimed in claim 1.

6. A liquid coating system or coating dispersion comprising the coating material composition of claim 1 as or in a binder.

7. The liquid coating system or coating dispersion as claimed in claim 6, further comprising additional pigments or customary coatings auxiliaries.

8. A process for preparing a coating material composition, comprising:

mixing a substance of formula (I) or (Ia) and p-toluenesulfonic acid with one or more polymerizable monomers and one or more additives selected from the group consisting of a polymer, a crosslinker, a crosslinking catalyst, a pigment, a dye, a filler, a reinforcing filler, a rheological aid, a wetting agent, a defoamer, an adhesion promoter, an additive for improving the surface smoothness, a flatting agent, a leveling agent, a film formation auxiliary, a dryer, an antiskinning agent, a light stabilizer, a corrosion inhibitor, a biocide, a flame retardant, a polymerization inhibitor, a photoinhibitor and a plasticizer, to form the coating material composition

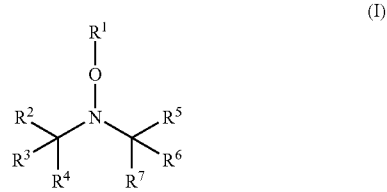

in which $R^1$ is a radical with at least one carbon atom, and the free radical $R^1\bullet$ corresponding to $R^1$ is able to initiate a free-radical polymerization of unsaturated monomers, the radicals $R^2$, $R^3$, $R^4$, $R^5$, $R^6$, and $R^7$ are identical or different straight or branched-chain, substituted or unsubstituted alkyl groups, substituted or unsubstituted aralkyl, alkylaryl or aryl groups, and —$CR^2R^3$ or —$CR^6R^7$ may be part of a cyclic structure, the radicals $R^4$ and $R^5$ are cyano-, ether-, hydroxyl-, nitro- or carbonyl-containing groups or $R^4CNCR^5$ is part of a substituted or unsubstituted cyclic structure to which at least one further saturated or unsaturated ring may be fused, or —$CR^2R^3R^4$ or —$CR^5R^6R^7$ is part of an aromatic ring;

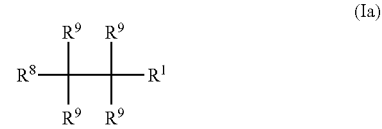

in which $R^1$ is a radical with at least one carbon atom, and the free radical $R^1\bullet$ corresponding to $R^1$ is able to initiate a free-radical polymerization of unsaturated monomers, $R^8$ and $R^9$ are hydrogen, identical or different straight- or branched chain, substituted or unsubstituted alkyl groups, substituted or unsubstituted aralkyl, alkylaryl or aryl groups, which may possess a polymeric character, at least two of the radicals $R^9$ are a phenyl radical or a substituted phenyl radical, and wherein the composition comprises the compound of formula I(a) which comprises diphenyl ethane units.

9. The composition as claimed in claim 1, comprising at least one of 2,2,6,6-tetramethyl-1-piperidinyloxy (TEMPO), 4-hydroxy-2,2,6,6-tetra-methyl-1-piperidinyloxy (HO-TEMPO) and di-tert-butyl nitroxide (DTBN).

10. The composition as claimed in claim 1, comprising 1-phenyl-1-(2', 2', 6',6'-tetramethyl-1'-piperidinyloxy)ethane.

* * * * *